United States Patent [19]
Ramsey

[11] Patent Number: 5,281,127
[45] Date of Patent: Jan. 25, 1994

[54] ARTICULATED CORE BLADE ASSEMBLY FOR USE IN AN INJECTION MOLDING MACHINE

[76] Inventor: William C. Ramsey, R.R. #5, Bryan, Ohio 43506

[21] Appl. No.: 882,818

[22] Filed: May 14, 1992

[51] Int. Cl.⁵ .............................................. B29C 45/44
[52] U.S. Cl. .................... 425/556; 249/180; 249/185; 264/318; 264/334; 425/557; 425/DIG. 58
[58] Field of Search ............... 425/577, DIG. 58, 556; 264/318, 334; 249/178, 180, 184, 185

[56] References Cited

U.S. PATENT DOCUMENTS

| | | | |
|---|---|---|---|
| 1,750,424 | 3/1930 | Olson | 425/346 |
| 2,147,217 | 2/1939 | Rector | 425/422 |
| 2,859,478 | 11/1958 | Glasson | 425/408 |
| 3,523,344 | 8/1970 | Huber et al. | 425/156 |
| 3,813,203 | 5/1974 | Fisker et al. | 425/441 |
| 3,865,529 | 2/1975 | Guzzo | 425/577 |
| 4,362,687 | 12/1982 | Olschewski et al. | 264/318 |
| 4,383,670 | 5/1983 | Olschewski et al. | 249/60 |
| 4,854,849 | 8/1989 | Sudo | 425/556 |
| 5,062,208 | 11/1991 | Goforth | 29/898.049 |
| 5,176,870 | 1/1993 | Mangone, Jr. | 425/577 |

*Primary Examiner*—Tim Heitbrink
*Attorney, Agent, or Firm*—Willian Brinks Hofer Gilson & Lione

[57] ABSTRACT

An articulated core blade assembly provides improved release of undercuts and similar structures in mold cavities. The articulated core blade assembly includes a retainer secured to an ejector plate, a lifter which moves the product and releases the undercut and a pivot arm which couples the lifter to the retainer. A first knuckle joint couples one end of the pivot arm to the retainer and a second knuckle joint couples the other end of the pivot arm to the lifter. The knuckle joints provide limited pivoting motion about parallel, spaced-apart axes. The articulated core blade assembly may be utilized in a broad range of injection molding machines utilizing plastics, metals and other injection molded materials.

21 Claims, 4 Drawing Sheets

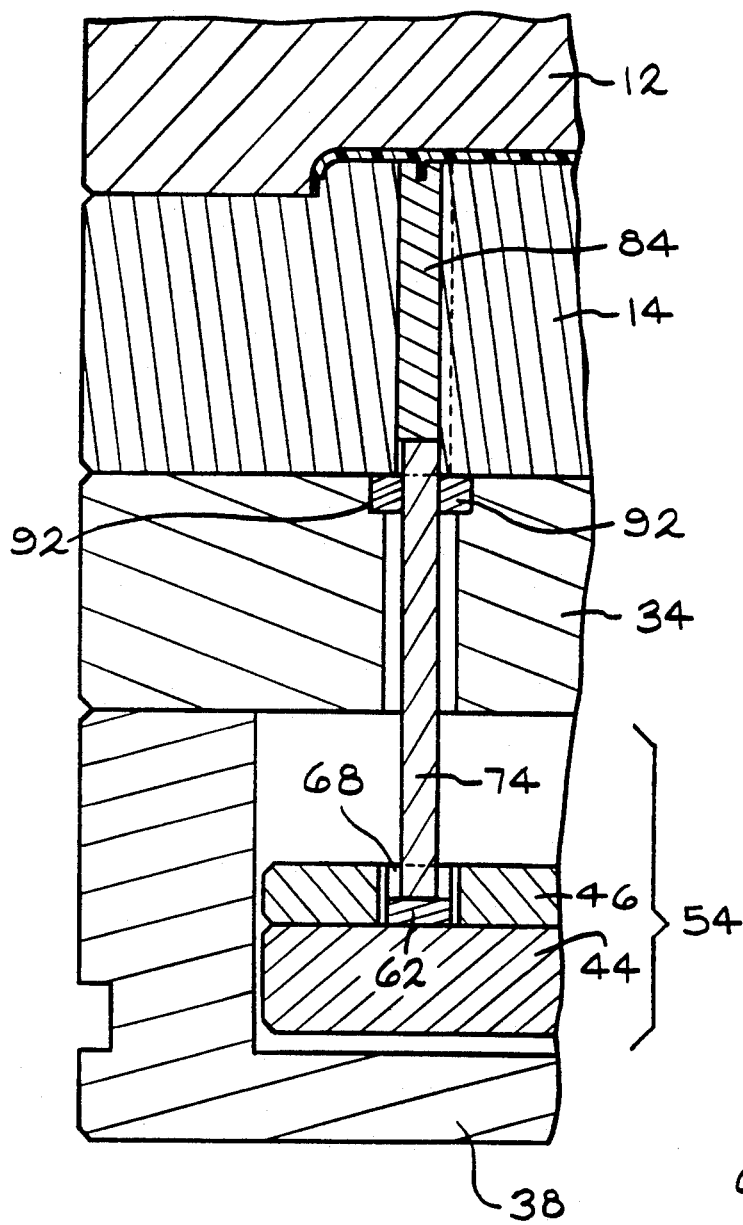
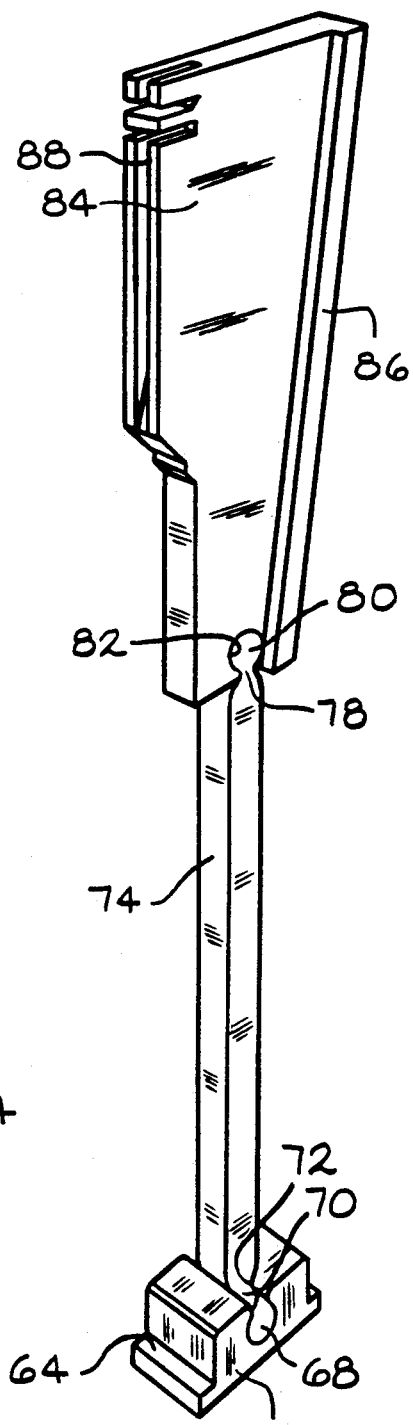
FIG. 3
FIG. 4

ARTICULATED CORE BLADE ASSEMBLY FOR USE IN AN INJECTION MOLDING MACHINE

BACKGROUND OF THE INVENTION

The invention relates generally to components for injection molding machines and more specifically to an articulated core blade for incorporation into injection molding machines which facilitates release of undercuts and similar features in molds.

The formation of undercuts and similar features in injection molded products typically requires the incorporation of moveable mold components. Such components are generally referred to as core blades.

Core blades are received within complementary passageways in the lower mold block and are coupled to an ejector plate which moves relative to the mold block. In a first position, the core blade is seated within the lower mold half and in this position forms the appropriate and required undercuts or similar features such as apertures having axes disposed in nonperpendicular orientations relative to the mold parting line. In a second position, the ejector plate has moved toward the lower mold block, raising the core blade while simultaneously translating it laterally, away from the undercut or aperture thereby releasing the molded part.

The technology of such moveable core components is represented in patented art. For example, U.S. Pat. No. 2,147,217 teaches a mold having side walls pivoted by knuckle joints which forms an undercut in the side walls of the product. U.S. Pat. No. 2,859,478 also teaches a pivoting mold component utilizing a knuckle joint.

U.S. Pat. No. 3,523,344 presents an apparatus for pressing ceramic tile wherein an articulated linkage ejects the completed product from the mold. In U.S. Pat. No. 3,813,203, a pair of pivoted arms are coupled by a pneumatic cylinder. The arms operate to open and close the outer ring of a mold utilized to form concrete pipe.

U.S. Pat. No. 4,383,670 discloses a method and apparatus for casting or molding cages for rolling elements. Pairs of slides having obliquely oriented outer, mating surfaces cooperate to form pockets in the cages. U.S. Pat. No. 5,062,208 discloses a similar method and apparatus wherein pairs of obliquely divided halves of a mold insert are mated to form generally spherical openings in a bearing separator.

U.S. Pat. No. 4,854,849 discloses an injection mold having undercut portions which utilize conventional guide pins which are coupled at their lower extremities to sliders and guides. Such sliders are prone to sticking and malfunction if not continually and properly lubricated. At their upper extremities, the guide pins are rigidly secured to mold segments which translate away from the molded product to effect release of same from the mold.

It is apparent from a review of the foregoing prior art that improvements in core blade technology are both possible and desirable.

SUMMARY OF THE INVENTION

An articulated core blade assembly provides improved release from the mold cavity of undercuts and similar structures having one or more surfaces generally not perpendicular to the parting line of the mold. The articulated core blade assembly includes a retainer secured to the ejector plate, a lifter which moves the product while simultaneously releasing the undercut and a pivot arm which couples the lifter to the retainer. A first knuckle joint couples one end of the pivot arm to the retainer and a second knuckle joint couples the other end of the pivot arm to the lifter. Preferably, the pivot arm is formed with a knuckle at each end and a complementary socket or recess is disposed in both the retainer and the lifter. It will, of course, be appreciated that the locations of the knuckles and recesses can be interchanged at one or both ends of the pivot arm. The knuckle joints provide limited pivoting motion of between about 5° and 20° about parallel, spaced-apart axes.

The articulated core blade assembly may be utilized in a broad range of injection molding machines utilizing plastics, metals and other injection moldable materials. The dual pivot configuration eliminates the use of sliding connection between the lifter and the ejector plate, a common source of difficulty with conventional core blades such as described above.

It is thus an object of the present invention to provide an articulated core blade which improves and facilitates release of a molded part having undercuts and apertures from the mold.

It is a further object of the present invention to provide an articulated core blade which is adaptable to a wide variety of injection molding applications.

It is a still further object of the present invention to provide an articulated core blade which is relatively inexpensive and easy to manufacture, install, and use.

It is a still further object of the present invention to provide an articulated core blade having a lifter, a pivot arm and a retainer which are coupled by a pair of knuckle joints which provide limited pivoting motion.

Further objects and advantages of the present invention will become apparent by reference to the following description of the preferred and alternate embodiments and appended drawings wherein like reference numerals refer to the same component or feature.

BRIEF DESCRIPTION OF THE DRAWINGS

FIG. 3 is a fragmentary, sectional view of a mold of an injection molding machine incorporating an articulated core blade assembly according to the present invention taken along line 3—3 of FIG. 1;

FIG. 4 is a perspective view of an articulated core blade according to the present invention.

DESCRIPTION OF THE PREFERRED AND ALTERNATE EMBODIMENTS

Figure 1:
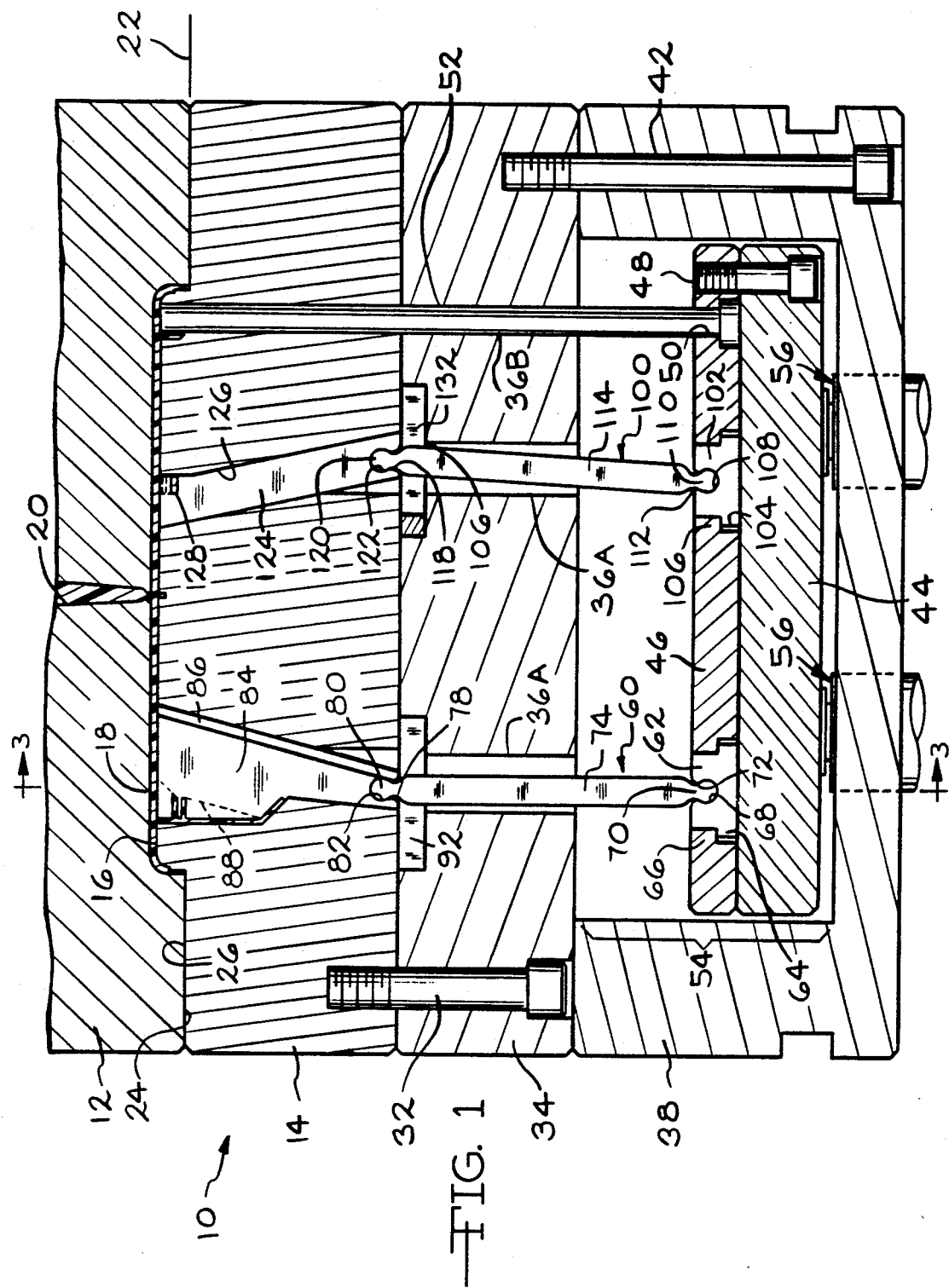
FIG. 1 is full, sectional view of a mold of an injection molding machine incorporating an articulated core blade assembly according to the present invention in a closed, product forming position.
Figure 2:
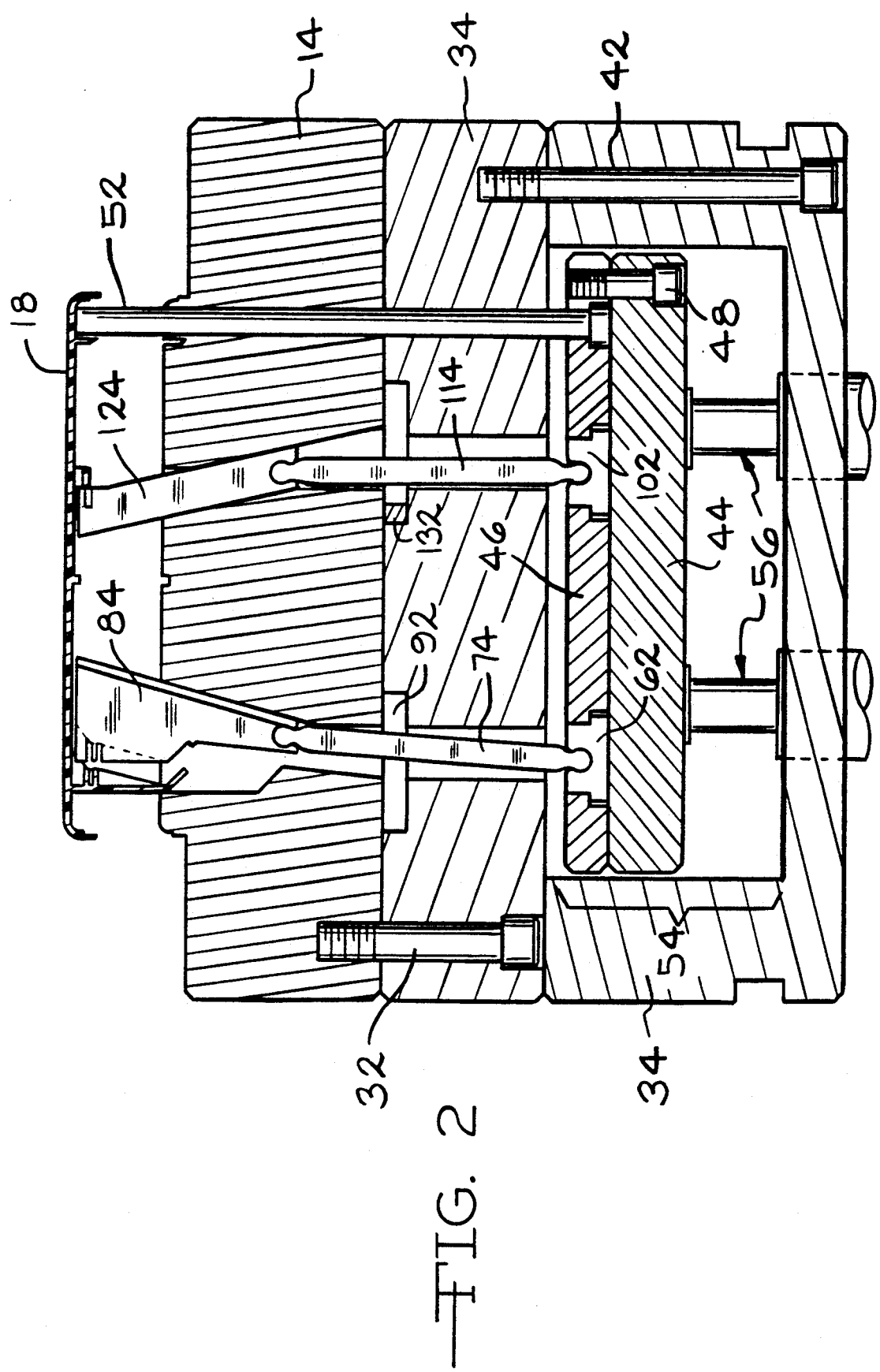
FIG. 2 is a full, sectional view of a mold of an injection molding machine incorporating an articulated core blade assembly according to the present invention in an open, product releasing position.

Referring now to FIGS. 1 and 2, relevant portions of a typical injection molding machine are illustrated in cross section and generally designated by the reference numeral 10. The illustrated portions 10 of an injection molding machine are a cavity block 12 and a core block 14 disposed directly beneath the cavity block 12. The cavity block 12 and the core block 14 cooperatively define a mold cavity 16 which is substantially a negative of a product 18 to be molded as will be readily appreciated. A gate 20 functions as a passageway for injection molded material to flow under pressure into the mold cavity 16 when the mold cavity 16 is closed to produce the product 18 in accordance with conventional injection molding practice. The cavity block 12 is disposed on suitable guides (not illustrated) for travel perpendicular to a parting line 22 defined by the lower face 24 of the cavity block 12 and the upper face 26 of the core block 14 when these components are in contact as illustrated in FIG. 1. Drive mechanisms which may be cams, single acting, spring biased or double acting pneumatic or hydraulic cylinders or any other suitable means (all not illustrated) provides motive force for raising and lowering the cavity block 12 as will be readily appreciated.

The core block 14 is secured by a plurality of threaded fasteners 32, one of which is illustrated in FIGS. 1 and 2, to a backup plate 34. The backup plate 34 generally defines a support member for the core block 14 and also includes a plurality of passageways 36A and 36B which receive various ejector components of the molding machine. The backup plate 34 is, in turn, supported by and secured to an ejector housing 38 by a plurality of threaded fasteners 42, one of which is illustrated in FIGS. 1 and 2.

Disposed within the ejector housing 38 is an ejector plate 44 which supports and is secured to a pin plate 46 by a plurality of fasteners 48 one of which is illustrated in FIGS. 1 and 2. All of the foregoing mold components are illustrative and exemplary of molding machines in general, and particularly injection molding machines, and may be fabricated of steel or other suitable strong and stable metal. Coupled to the ejector plate 44 by the pin plate 46 for translation therewith and passing through an aperture 50 in the pin plate 46 is an ejector pin 52. Depending upon the size of the mold cavity 16 and the product 18, a plurality of the ejector pins 52 will typically be utilized. As the ejector plate 44 translates vertically within the space 54 between the inside bottom face of the ejector housing 38 and the lower surface of the backing plate 34, the ejector pin 52 translates vertically into the mold cavity 16, raising and dislodging the molded product 18 therefrom. One or more single acting, spring biased or double acting pneumatic or hydraulic piston and cylinder assemblies 56 or functionally analogous devices such as sliding or rotating cams may be utilized to vertically translate the ejector plate 44 and associated components from the lowered, product forming position illustrated in FIG. 1 to the raised, product ejecting position illustrated in FIG. 2.

Turning now to FIGS. 1, 2 and 4, a first articulated core blade assembly 60 includes a first retainer 62 which is trapped by the pin plate 46 by a cooperating pair of ears or flanges 64 on the retainer 62 and an overhanging complementary lip 66 formed in the pin plate 46. The retainer 62 defines a centrally disposed semi-cylindrical socket or recess 68 which preferably extends through the retainer 62 and communicates with a slot or throat defined by opposed edges of the retainer 62. The recess 68 of the retainer 62 receives a complementarily configured semi-cylindrical knuckle 70 having an adjacent throat region 72 disposed on one end of a first pivot arm 74. The pivot arm 74 may define any convenient or desired length and is terminated at its opposite end by a second throat region 78 and semi-cylindrical knuckle 80. The knuckle 80 is received within a complementarily formed semi-cylindrical socket or recess 82 defined by the lower end of a first lifter 84. The recess 82 preferably extends through the first lifter 84 and communicates with a slot or throat defined by opposed edges of the lifter 84.

The knuckle joints comprising the recess 68 and the knuckle 70 and the knuckle 80 and the recess 82 may also be mating ball and socket components. This configuration does not, however, provide any known performance benefits and such parts are generally more difficult to manufacture.

The lifter 84 may include a longitudinal flange or heel 86 extending along one vertical edge. The heel 86 cooperates with a complementary channel (not illustrated) in the core block 14 to guide its motion. The opposite edge defines a mold cavity surface 88 which produces an undercut or other feature in the product 18 which cannot be released by simple upward motion of the product 18 out of the mold cavity 16, such as that provided by the ejector pins 52.

The cooperating recess 68 and the knuckle 70 and the cooperating recess 82 and the knuckle 80 preferably provide limited pivoting motion of about 8° to 10° each but each range of motion may be enlarged to between about 5° to 20° or greater if desired. The retainer 62, the pivot arm 74 and the lifter 84 are preferably made of hardened tool steel, bronze or other suitable material and are adapted to be fabricated by electron discharge machining (EDM). While a pivot arm 74 having two knuckles 70 and 80 which mate with the recesses 68 in the retainer 62 and the recess 82 in the lifter 84 is the preferred arrangement, it will be appreciated that one or both of these features and locations may be exchanged, thereby locating the recesses 68 and 82 on the pivot arm 74 and the knuckles 70 and 80 on the retainer 62 and the lifter 84.

As better illustrated in FIG. 3, a pair of parallel bars or landing pads 92 extend generally perpendicularly and horizontally along opposite faces of the pivot arm 74. The landing pads 92 function as shims or stops which adjust the vertical, retracted position of the lifter 84 in order that the undercuts and other features formed by the lifter 84 be properly positioned within the mold cavity 16. The landing pads 92 are preferably used because the vertical travel of the ejector plate 44 and associated components in a typical injection molding machine 10 may not be controlled with sufficient accuracy to properly position the lifter 84 within the mold block 14 to provide optimum quality to the molded product 8.

A second articulated core blade assembly 100 includes a second retainer 102 which is trapped by the pin plate 46 by a cooperating base flange 104 on the retainer 102 and an overhanging complementary lip 106 formed on the pin plate 46. The retainer 102 defines a centrally disposed semi-cylindrical recess 108 which receives a complementarily configured semi-cylindrical knuckle 110 and adjacent throat region 112 on one end of a second pivot arm 114. The pivot arm 114 may define any convenient or desired length and is terminated at its opposite end by a second throat region 118 and semi-cylindrical knuckle 120. The knuckle 120 is received within a complementarily formed semi-cylindrical recess 122 defined by the lower end of a second lifter 124. The lifter 124 does not include a heel inasmuch as its translation is fully constrained by the parallel walls of a passageway 126 in the core block 14. An ear or lip 128 on the lifter 124 defines a mold cavity region which produces an undercut or other feature on the product 18 which cannot be released by simple upward motion of the product 18 out of the mold cavity 16, such as that provided by the ejector pins 52.

As illustrated in FIGS. 1 and 2, a pair of parallel landing pads 132 comprise portions of a unitary, U-shaped member which extends generally perpendicularly and horizontally around and along opposite faces of the pivot arm 112. The landing pads 132 function in the same manner as the pair of landing pads 92, discussed above.

Not only does the second articulated core blade assembly 100 illustrate a core blade assembly without a heel and an alternate landing pad construction, it also presents an arrangement in which the retainer 102, the recess 108 and the knuckle 110 are offset, i.e., not aligned with, the knuckle 120 received within the recess 122 of the second lifter 124 relative to the direction of travel of the ejector plate 44. This offset may alternately be described as orienting the second pivot arm 114 in an oblique, i.e., angled, position relative to the direction of travel of the ejector plate 44 when it is in its lowered (retracted) position. Such offset, when utilized with a specially configured passageway 126 may provide complex movement of the second lifter 124.

Figure 5:
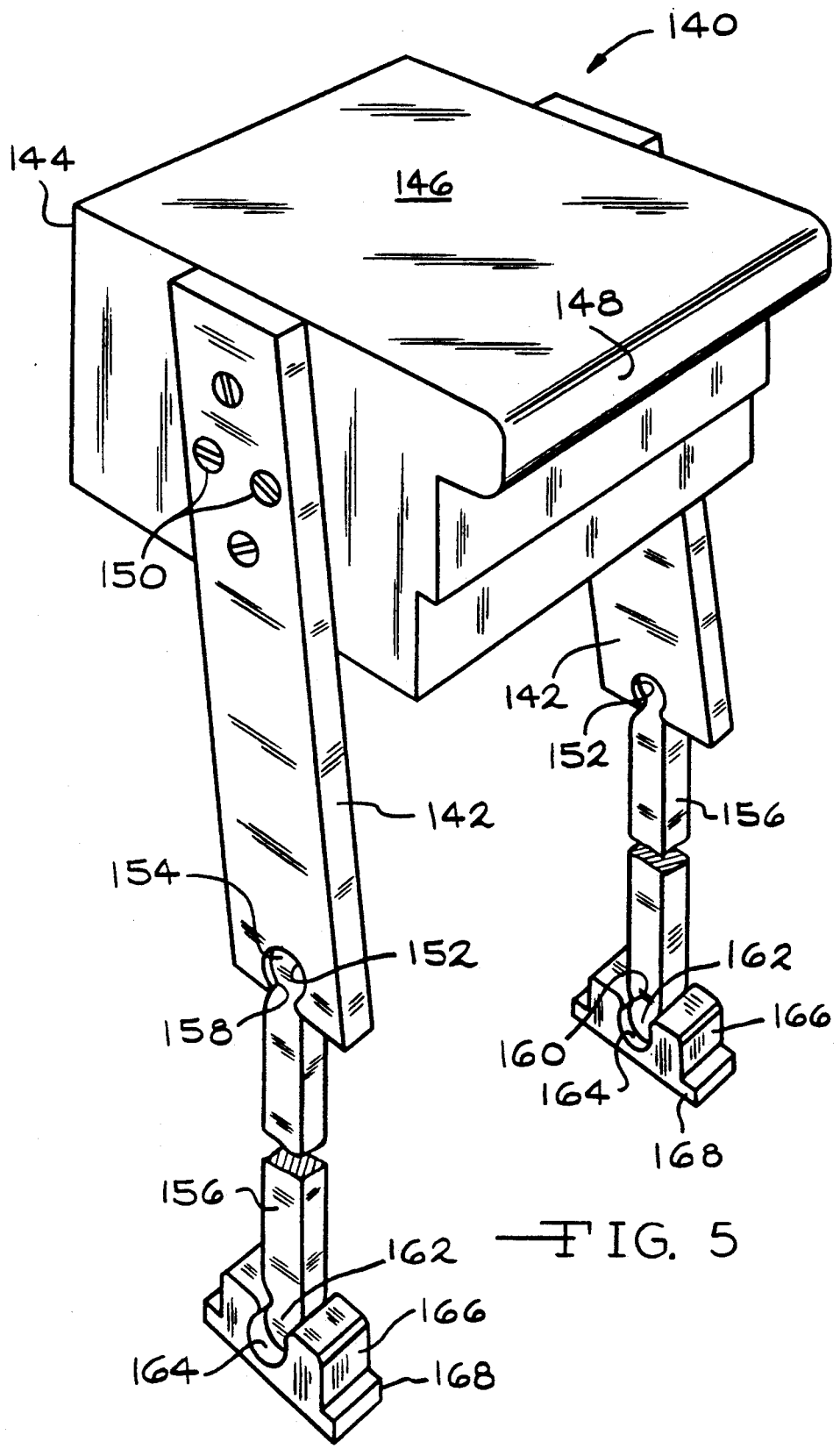
FIG. 5 is a perspective view of an alternate embodiment articulated core blade assembly according to the present invention.

Referring now to FIG. 5, a first alternate embodiment of an articulated core blade assembly 140 is illustrated. The core blade assembly 140 is illustrative of applications in which an undercut edge or other feature requires a core blade to extend horizontally a significant length along the mold cavity 16. In order to achieve release of such a significant length of undercut, several spaced-apart apertures or other similar features requiring a release mechanism, a pair of lifters 142 are utilized in parallel, spacedapart arrangement and are coupled to a release block 144 having an upper surface 146 and an overhanging lip 148 which form undercut portions of the molded product as will be readily appreciated. The pair of lifters 142 are preferably secured to the sides of the release block 144 by a plurality of threaded fasteners 150.

Each of the pair of lifters 142 defines a semi-cylindrical recess 152 which receives a semi-cylindrical knuckle 154 of a respective pivot arm 156. The pivot arms 156 may, for all effects and purposes, be the same as the pivot arms 74 and 124 and thus both include a narrow, throat region 158. The single axis pivot formed by the semi-cylindrical knuckles 154 disposed within the semi-cylindrical recesses 152, preferably provides between about 8° and 10° of angular motion, a range which may be increased from between about 5° and 20° of angular motion if necessary or desired. The opposite ends of the pivot arms 156 include a narrow throat region 160 and a semi-cylindrical knuckle 162 which is received within a complementarily configured semi-cylindrical recess 164 in a retainer 166. The retainer 166 preferably includes a foot or flange 168 which may be utilized with cooperating features of an ejector plate to secure the retainer 166 thereto, as described above.

Inspection of the preferred embodiment articulated core blade assemblies 60 and 100 and the alternate embodiment articulated core blade assembly 140, reveals that such devices may take many forms with regard to the molding surfaces such as variations in length, curvature, lip configuration and the like in order to accommodate and fabricate undercuts, apertures and other features of injection molded products requiring movement of mold components in order to release a molded product. Inasmuch as the present invention relates directly to articulated core blade assemblies rather than the specific configuration of the mold undercut and the mold components forming same, it will be appreciated that articulated core blades according to the present invention will have wide and diverse application to injection molding machines requiring moveable mold components to effect release of molded products which require undercuts, apertures and similar features.

The foregoing disclosure is the best mode devised by the inventor for practicing this invention. It is apparent, however, that apparatus incorporating modifications and variations will be obvious to one skilled in the art of injection molding machines and molds. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following c

I claim:

1. An articulated core blade for use in a mold assembly of an injection molding machine comprising, in combination,
    a retainer block having a first recess defining a curved side wall and an open throat defined by opposed, spaced-apart edges,
    a lifter having a second recess defining a curved side wall and an open throat defined by opposed, spaced-apart edges, said lifter including means for forming an undercut, aperture or undercut feature,
    a pivot arm having a pair of ends, each of said ends defining a knuckle adapted to be received within a respective one of said recesses.

2. The articulated core blade of claim 1 further including a heel extending along an edge opposite said forming means.

3. The articulated core blade of claim 1 wherein said retainer block is adapted to be received on an ejector plate of the molding machine.

4. The articulated core blade of claim 1 wherein said retainer block includes a pair of outwardly extending ears which are adapted to couple said retainer block to a pin plate of an injection molding machine.

5. The articulated core blade of claim 1 wherein said retainer block, said pivot arm and said lifter are made of hardened tool steel or bronze.

6. The articulated core blade of claim 1 wherein said recess and said open throat communicate and extend through said retainer block.

7. The articulated core blade of claim 1 wherein said curved side walls of said retainer block define a cylindrical surface interrupted by said open throat.

8. The articulated core blade of claim 1 wherein said retainer block is received on an ejector plate and said pivot arm is disposed parallel to the direction of translation of said ejector plate.

9. An articulated core blade assembly for incorporation in an injection molding machine comprising, in combination,
    a retainer adapted for securement to an ejector plate of the injection molding machine,
    a pivot arm having a first end and a second end,
    first means disposed on said retainer and said pivot arm for pivotally coupling said first end of said pivot arm to said retainer, a lifter having means for forming an undercut, aperture of undercut feature, and second means disposed on said second end of said pivot arm and said lifter for pivotally coupling said second end of said pivot arm to said lifter, said first and said second means for pivotally coupling including a pivot member disposed within a complementarily configured socket.

10. The articulated core blade assembly of claim 9 wherein said retainer includes a pair of outwardly extending ears which are adapted to couple said retainer to the ejector plate of said injection molding machine.

11. The articulated core blade assembly of claim 9 wherein said retainer is secured to an ejector plate and said pivot arm is disposed substantially parallel to the direction of translation of said ejector plate.

12. The articulated core blade assembly of claim 9 further including a heel extending along an edge of said lifter opposite said forming means.

13. The articulated core blade assembly of claim 9 wherein said pivot member is a knuckle.

14. An articulated core blade assembly for use in injection molding machines comprising, in combination, a retainer adapted for disposition upon an ejector plate, a pivot arm having a first end and a second end, first means disposed on said retainer and said pivot arm for pivotally coupling said first end of said pivot to said retainer, a lifter having means for forming an undercut, aperture or undercut feature, and second means disposed on said second end of said pivot arm and said lifter for pivotally coupling said second end of said pivot arm to said lifter.

15. The articulated core blade assembly of claim 14 wherein said first and said second means for pivotally coupling each end includes a knuckle disposed within a complementarily configured socket.

16. The articulated core blade assembly of claim 15 wherein said knuckles are disposed upon said pivot arm and said sockets are disposed in said retainer and said lifter.

17. The articulated core blade assembly of claim 14 wherein said means for forming includes a member having said retainer, said pivot arm, said lifter and said first and said second means disposed adjacent one end of said member and further including a second retainer, a second pivot arm, a second lifter and additional first means for pivotally coupling a first end of said second pivot arm to said second retainer and additional second means for pivotally coupling a second end of said second pivot arm to said second lifter disposed adjacent the other end of said member.

18. In an injection molding machine having a cavity block and a core block cooperatively defining a mold cavity and an ejector plate disposed for translation toward and away from said mold cavity, the improvement comprising, an articulated core blade including, in combination, a retainer having a first recess defining a curved side wall and an open throat defined by opposed, spaced-apart edges, a lifter having a second recess defining a curved side wall and an open throat defined by opposed, spaced-apart edges, said lifter including means for forming an undercut, an aperture or an undercut feature, a pivot arm having a pair of ends, each of said ends defining a knuckle adapted to be received within a respective one of said recesses.

19. The injection molding machine of claim 18 wherein said knuckles provide between 5° and 20° of pivoting motion.

20. The injection molding machine of claim 18 wherein said retainer includes flange means for coupling to the ejector plate.

21. The injection molding machine of claim 18 wherein said lifter includes a flange extending along one edge of said lifter.

* * * * *